(12) United States Patent
Chou

(10) Patent No.: US 9,307,492 B2
(45) Date of Patent: Apr. 5, 2016

(54) OPERATING MODE SWITCHING METHOD

(71) Applicant: HTC Corporation, Taoyuan County (TW)

(72) Inventor: Fu-Chiang Chou, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 0 days.

(21) Appl. No.: 13/674,104

(22) Filed: Nov. 12, 2012

(65) Prior Publication Data

US 2014/0134990 A1    May 15, 2014

(51) Int. Cl.
*H04W 52/02* (2009.01)

(52) U.S. Cl.
CPC ...... *H04W 52/0251* (2013.01); *H04W 52/0235* (2013.01); *Y02B 60/50* (2013.01)

(58) Field of Classification Search
USPC ...... 455/418–420, 41.1–41.3, 456.4
See application file for complete search history.

(56) References Cited

U.S. PATENT DOCUMENTS

| | | | | |
|---|---|---|---|---|
| 6,438,385 | B1* | 8/2002 | Heinonen et al. | 455/501 |
| 2007/0232358 | A1* | 10/2007 | Sherman | H04B 1/3805 455/560 |
| 2007/0249383 | A1* | 10/2007 | Wiklof | G06K 7/0004 455/522 |
| 2009/0046763 | A1* | 2/2009 | Kerai | H04B 1/713 375/136 |
| 2009/0257590 | A1* | 10/2009 | Ding | H04L 9/0825 380/247 |
| 2010/0056124 | A1 | 3/2010 | Keating | |
| 2011/0070834 | A1* | 3/2011 | Griffin | G06K 7/0008 455/41.1 |
| 2011/0177780 | A1* | 7/2011 | Sato | H04W 36/14 455/41.1 |
| 2011/0183614 | A1* | 7/2011 | Tamura | H04M 1/7253 455/41.2 |
| 2011/0215921 | A1* | 9/2011 | Ben Ayed | G08B 1/08 340/539.11 |
| 2011/0313922 | A1* | 12/2011 | Ben Ayed | G06Q 20/108 705/42 |
| 2012/0019361 | A1* | 1/2012 | Ben Ayed | G06F 21/32 340/5.83 |
| 2013/0006847 | A1* | 1/2013 | Hammad | G06Q 20/20 705/39 |
| 2013/0195271 | A1* | 8/2013 | Miyabayashi | H04L 63/0823 380/255 |
| 2013/0257614 | A1* | 10/2013 | Perkins | G06F 19/327 340/539.13 |

OTHER PUBLICATIONS

Office action mailed on Nov. 10, 2015 for the Taiwan application No. 102100156, filing date Jan. 3, 2013, p. 1-8.

* cited by examiner

*Primary Examiner* — Mehmood B Khan
(74) *Attorney, Agent, or Firm* — Winston Hsu; Scott Margo

(57) ABSTRACT

An operating mode switching method for a electronic device is disclosed. The operating mode switching method includes receiving a notification message via a proximity-based wireless communication technology; switching from an initial operating mode to an environmental operating mode corresponding to the notification message; and switching from the target operating mode back to the initial operating mode when not effectively receiving an environmental signal corresponding to the notification message via a short-ranged wireless communication technology.

20 Claims, 1 Drawing Sheet

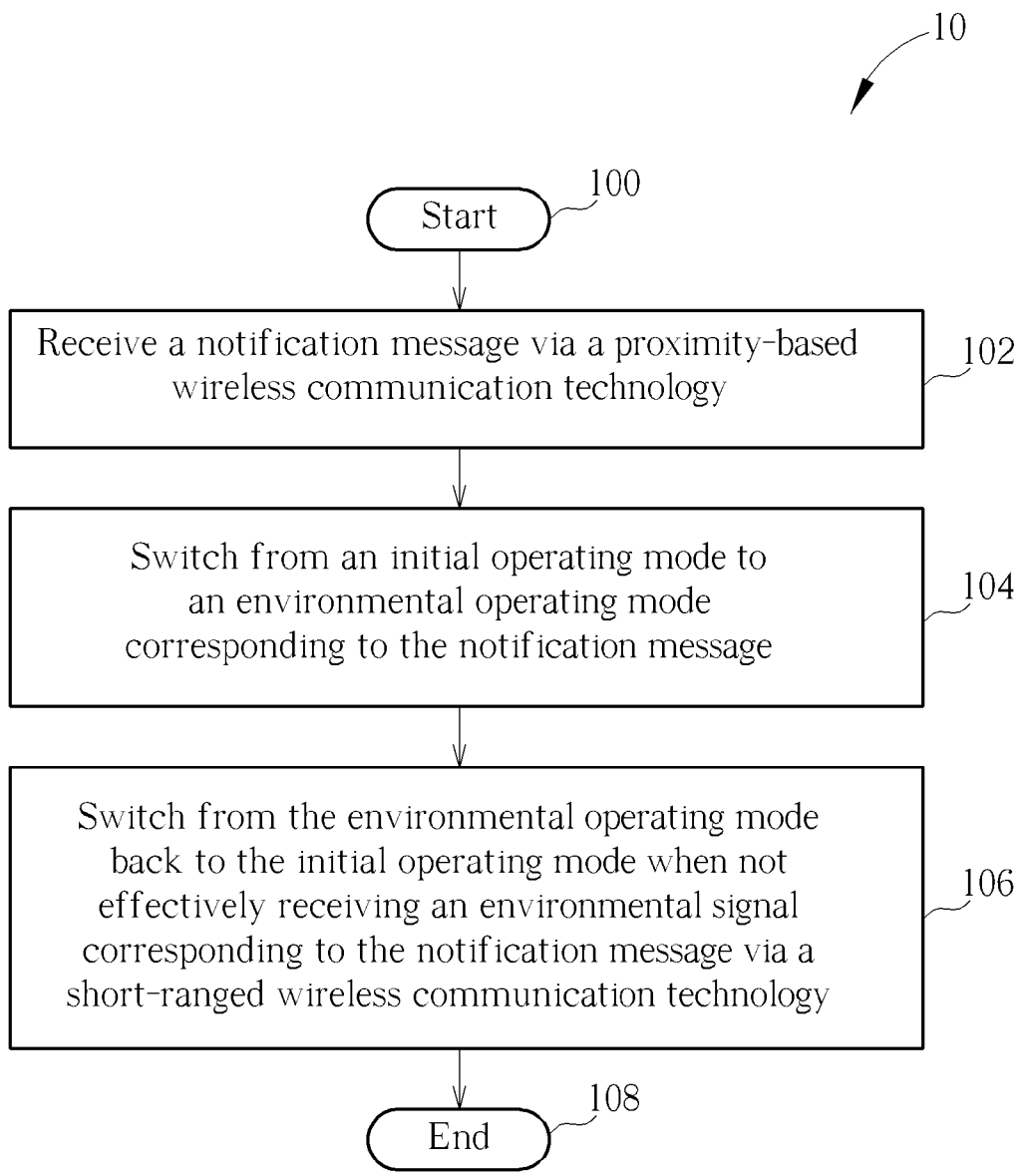

OPERATING MODE SWITCHING METHOD

BACKGROUND OF THE INVENTION

1. Field of the Invention

The present invention relates to an operating mode switching method for an electronic device, and more particularly, to an operating mode switching method capable of avoiding unintentionally switching from an initial operating mode into an environmental operating mode when entering an environment, and capable of automatically switching from the environmental operating mode back to the initial operating mode when leaving the environment.

2. Description of the Prior Art

Enormous developments in computer networks enable data and information to spread out rapidly, and advanced technology and knowledge to be communicated efficiently. The development of wireless networks in recent years further enables users to access network resources anytime and anywhere to make information technology more integrated with people's lives and work.

For example, in a near field communication (NFC) application (i.e. a proximity-based wireless communication scenario), when a user enters an environment (e.g. a meeting room or a bedroom), the user can pass a electronic device (e.g. a mobile phone, a personal digital assistant, etc.) with an NFC reader near an NFC tag device, such that the electronic device switches to an environmental operating mode (e.g. a mute mode or a sleep mode) as indicated by the NFC tag device. Then, when the user leaves the environment, the user can pass the electronic device near the NFC tag device again, such that the electronic device can switch back to an initial operating mode.

However, in the above proximity-based wireless communication scenario, since the user has to intentionally pass the electronic device near the NFC tag device to switch the operating mode of the electronic device, the user often remembers to pass the electronic device near the NFC tag device to switch the electronic device into the environmental operating mode when entering the environment, but forgets to pass the electronic device near the NFC tag device again to switch the electronic device back to the initial operating mode when leaving the environment. Therefore, the electronic device stays in the environment operating mode after leaving the environment, which causes issues (e.g. missed call).

For another example, in Bluetooth application (i.e. a short-ranged wireless communication scenario), when a user enters an environment, the electronic device receives signals from a Bluetooth host device and switches to an environmental operating mode accordingly. Then, when the user leaves the environment, the electronic device stops receiving the signals from the Bluetooth host device and switches back to an initial operating mode accordingly.

However, in the above short-ranged wireless communication scenario, the electronic device automatically switches the operating mode according to whether to receive the signals from the Bluetooth host device, but the user may not really intent to switch to the electronic device to the environmental operating mode (e.g. the user may enter the environment for other purposes), which causes issues.

As can be seen from the above, the electronic device stays in the environment operating mode after leaving the environment in the proximity-based wireless communication scenario, while unintentionally switching to the environment operating mode when entering the environment in the short-ranged wireless communication scenario. Thus, there is a need to improve over the prior art.

SUMMARY OF THE INVENTION

It is therefore an objective of the present invention to provide an operating mode switching method capable of avoiding unintentionally switching from an initial operating mode into an environmental operating mode when entering an environment, and capable of automatically switching from the environmental operating mode back to the initial operating mode when leaving the environment.

The present invention discloses an operating mode switching method for an electronic device is disclosed. The operating mode switching method includes receiving a notification message via a proximity-based wireless communication technology; switching from an initial operating mode to an environmental operating mode corresponding to the notification message; and switching from the target operating mode back to the initial operating mode when not effectively receiving an environmental signal corresponding to the notification message via a short-ranged wireless communication technology.

The present invention discloses an electronic device for switching operating mode. The electronic device includes a computer readable recording medium for storing program code corresponding to a process; and a processor coupled to the computer readable recording medium, for processing the program code to execute the process. The process includes receiving a notification message via a proximity-based wireless communication technology; switching from an initial operating mode to an environmental operating mode corresponding to the notification message; and switching from the environmental operating mode back to the initial operating mode when not effectively receiving an environmental signal corresponding to the notification message via a short-ranged wireless communication technology.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The FIGURE is a schematic diagram of an operating mode switching process according to an embodiment of the present invention.

DETAILED DESCRIPTION

Please refer to the FIGURE, which is a schematic diagram of an operating mode switching process 10 according to an embodiment of the present invention. The operating mode switching process 10 is utilized for a electronic device such as a mobile phone, a personal digital assistant (PDA), tablet PC, or any other device needs to switch into different operating modes for different environments. The electronic device can include a computer readable recording medium for storing program code corresponding to the operating mode switching process 10, a processor coupled to the computer readable recording medium, for processing the program code to execute the operating mode switching process 10, and a wireless communication module for supporting wireless communication. The operating mode switching process 10 includes:

Step 100: Start.

Step 102: Receive a notification message via a proximity-based wireless communication technology.

Step 104: Switch from an initial operating mode to an environmental operating mode corresponding to the notification message.

Step 106: Switch from the environmental operating mode back to the initial operating mode when not effectively receiving an environmental signal corresponding to the notification message via a short-ranged wireless communication technology.

Step 108: End.

According to the operating mode switching process 10, when a user enters an environment (e.g. a meeting room or a bedroom), the user can pass the electronic device near a tag device, such that the electronic device can receive a notification message from the tag device via a proximity-based wireless communication technology, e.g. a near field communication (NFC) technology, radio frequency identification (RFID) communication technology or infrared data association (IrDA) communication technology, and switch from an initial operating mode to an environmental operating mode indicated by the notification message. The examples of the operating mode could be, but not limited, a mute mode, an airplane mode or a system power saving mode such as sleep mode and shutdown mode. The mute mode means the speaker is turned off in order to keep the electronic device silent. Sometimes enabling the mute mode might also enable vibrating function of vibrator in order to notify user while an incoming event occurred on the electronic device. The airplane mode means a mode to disable all wireless communication functionalities such as telephone services (e.g. GSM, WCDMA and CDMA), Bluetooth and WiFi while a user is on the airplane. The system power saving mode means a mode that the system of electronic device could enter in order to reduce/save power consumption. The most well-known term of this system power saving mode is the sleep mode, which usually turns off display of the electronic device and let processor enters lower power consumption state. Another well-known term of this power saving mode is the shutdown mode, which shutdowns the electronic device power. Besides, the notification message also indicates there is a host device which transmits the environmental signal in the environment via a short-ranged wireless communication technology, e.g. a Bluetooth technology, a Bluetooth low energy (BLE) technology or a WiFi technology (i.e. the notification message indicates a specific signal type or a signal packet with specific data patent of the environmental signal, a device name of the host device). Therefore, when the user stays in the environment, the electronic device continuously receives the environmental signal, and determines still staying in the environment and thus stays in the environmental operating mode. On the other hand, when the user leaves the environment and thus the electronic device does not effectively receive the environmental signal (e.g. disconnect with the host device, signal intensity less than a specific intensity, not receive specific signal type, not receive a signal packet with specific data patent or not receive the environmental signal) indicated by the notification message via the short-ranged wireless communication technology, the electronic device determines not staying in the environment and switches from the environmental operating mode back to the initial operating mode.

Under such a situation, since an operating range of the short-ranged wireless communication technology is longer than an operating range of the proximity-based wireless communication technology (e.g. NFC has an operating range about 0-2.5 inches and Bluetooth has an operating range about 0-6 feet ranges), the user has to intentionally pass the electronic device near the tag device to switch the electronic device from the initial operating mode to the environmental operating mode via the proximity-based wireless communication technology. Besides, the electronic device can automatically switches from the environmental operating mode back to the initial operating mode via the short-ranged wireless communication technology without operations of the user. As a result, the present invention can avoid unintentionally switching from the initial operating mode into the environmental operating mode when entering the environment, and can automatically switch from the environmental operating mode back to the initial operating mode when leaving the environment.

For example, when the user enters into a meeting room and prepares to start a meeting, the user can pass the electronic device with an NFC reader near an NFC tag device, such that the NFC tag device informs the electronic device to switch to a mute mode and indicates there is a Bluetooth host device which transmits the environmental signal in the meeting room via Bluetooth technology. Therefore, the electronic device can establish Bluetooth connection with the Bluetooth host device in the meeting room. Then, when the user leaves the meeting room about 6 feet far, the electronic device disconnects with the Bluetooth host device and switches to the initial operating mode.

For another example, when the user enters into a bedroom and prepares to sleep, the user can pass the electronic device with an NFC reader near an NFC tag device, such that the NFC tag device informs the electronic device to switch to a sleep mode (turning some functions off) and indicates there is a WiFi host device which transmits the environmental signal in the bedroom via WiFi technology. Therefore, the electronic device can receive and monitor WiFi signals from the WiFi host device in the bedroom. Then, when the user leaves the bedroom, the electronic device receives the environmental signal from the WiFi host device with a signal intensity less than a specific intensity, and thus determines not staying in the bedroom and switches to the initial operating mode.

Noticeably, the spirit of the present invention is to intentionally switch from the initial operating mode to the environmental operating mode via the proximity-based wireless communication technology, and automatically switch from the environmental operating mode back to the initial operating mode via the short-ranged wireless communication technology, so as to avoid unintentionally switching from the initial operating mode into the environmental operating mode when entering the environment, and to automatically switch from the environmental operating mode back to the initial operating mode when leaving the environment. Those skilled in the art can make modifications or alterations accordingly.

For example, when the electronic device determines whether not to effectively receive the environmental signal, the electronic device can determine whether not to effectively receive the environmental signal for a specific period, so as to avoid mistakenly switching back to the initial operating mode when the environmental signal is interrupted. Besides, the tag device for sending the notification message via the proximity-based wireless communication technology and the host device for transmitting the environmental signal via the short-ranged wireless communication technology can be integrated into one device, e.g. a BLE device which can continuously broadcast packets with low power and thus can be integrated with an NFC tag device, wherein the electronic device can determine whether to effectively receives the environmental signal by determining whether to receive packets broadcasted by the BLE device without establishing connection.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM).

In the prior art, the electronic device stays in the environment operating mode after leaving the environment in the proximity-based wireless communication scenario, while unintentionally switching to the environment operating mode when entering the environment in the short-ranged wireless communication scenario.

In comparison, the present invention can intentionally switch from the initial operating mode to the environmental operating mode via the proximity-based wireless communication technology, and automatically switch from the environmental operating mode back to the initial operating mode via the short-ranged wireless communication technology, so as to avoid unintentionally switching from the initial operating mode into the environmental operating mode when entering the environment, and to automatically switch from the environmental operating mode back to the initial operating mode when leaving the environment.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An operating mode switching method for an electronic device, comprising:
   receiving a notification message via a proximity-based wireless communication technology in an initial operating mode;
   switching from the initial operating mode to an environmental operating mode corresponding to the notification message after receiving the notification message via the proximity-based wireless communication technology; and
   staying in the environmental operating mode if continuously receiving an environmental signal corresponding to the notification message via a short-ranged wireless communication technology, and switching from the environmental operating mode back to the initial operating mode when not effectively receiving the environmental signal corresponding to the notification message via the short-ranged wireless communication technology;
   wherein the initial operating mode and the environmental operating mode respectively provide different user notifications in response to a received incoming event.

2. The operating mode switching method of claim 1, wherein an operating range of the short-ranged wireless communication technology is longer than an operating range of the proximity-based wireless communication technology.

3. The operating mode switching method of claim 1, wherein the proximity-based wireless communication technology comprises at least one of the following: a near field communication (NFC) technology, a radio frequency identification (RFID) communication technology and an infrared data association (IrDA) communication technology.

4. The operating mode switching method of claim 1, wherein the short-ranged wireless communication technology comprises at least one of the following: a Bluetooth technology, a Bluetooth low energy (BLE) technology and a WiFi technology.

5. The operating mode switching method of claim 1, wherein the step of not effectively receiving the environmental signal corresponding to the notification message via the short-ranged wireless communication technology comprises:
   not receiving the environmental signal corresponding to the notification message via the short-ranged wireless communication technology for a specific period.

6. The operating mode switching method of claim 1, wherein the step of not effectively receiving the environmental signal corresponding to the notification message via the short-ranged wireless communication technology comprises:
   disconnecting with a host device which transmits the environmental signal corresponding to the notification message via the short-ranged wireless communication technology.

7. The operating mode switching method of claim 1, wherein the step of not effectively receiving the environmental signal corresponding to the notification message via the short-ranged wireless communication technology comprises:
   receiving the environmental signal with a signal intensity less than a specific intensity.

8. The operating mode switching method of claim 1, wherein the environmental operating mode comprises at least one of the following: a mute mode, an airplane mode and a system power saving mode.

9. An electronic device for switching operating mode, the electronic device comprising:
   a computer readable recording medium for storing program code corresponding to a process; and
   a processor coupled to the computer readable recording medium, for processing the program code to execute the process;
   wherein the process comprises:
      receiving a notification message via a proximity-based wireless communication technology in an initial operating mode;
      switching from the initial operating mode to an environmental operating mode corresponding to the notification message after receiving the notification message via the proximity-based wireless communication technology; and
      staying in the environmental operating mode if continuously receiving an environmental signal corresponding to the notification message via a short-ranged wireless communication technology, and switching from the environmental operating mode back to the initial operating mode when not effectively receiving the environmental signal corresponding to the notification message via the short-ranged wireless communication technology;
      wherein the initial operating mode and the environmental operating mode respectively provide different user notifications in response to a received incoming event.

10. The electronic device of claim 9, wherein an operating range of the short-ranged wireless communication technology is longer than an operating range of the proximity-based wireless communication technology.

11. The electronic device of claim 9, wherein the proximity-based wireless communication technology comprises at least one of the following: a near field communication (NFC) technology, a radio frequency identification (RFID) communication technology and an infrared data association (IrDA) communication technology.

12. The electronic device of claim 9, wherein the short-ranged wireless communication technology comprises at least one of the following: a Bluetooth technology, a Bluetooth low energy (BLE) technology and a WiFi technology.

13. The electronic device of claim 9, wherein the step of not effectively receiving the environmental signal corresponding to the notification message via the short-ranged wireless communication technology comprises:

not receiving the environmental signal corresponding to the notification message via the short-ranged wireless communication technology for a specific period.

14. The electronic device of claim 9, wherein the step of not effectively receiving the environmental signal corresponding to the notification message via the short-ranged wireless communication technology comprises:

disconnecting with a host device which transmits the environmental signal corresponding to the notification message via the short-ranged wireless communication technology.

15. The electronic device of claim 9, wherein the step of not effectively receiving the environmental signal corresponding to the notification message via the short-ranged wireless communication technology comprises:

receiving the environmental signal with a signal intensity less than a specific intensity.

16. The electronic device of claim 9, wherein the environmental operating mode comprises at least one of the following: a mute mode, an airplane mode and a system power saving mode.

17. The operating mode switching method of claim 1, wherein the step of staying in the environmental operating mode if continuously receiving the environmental signal corresponding to the notification message via the short-ranged wireless communication technology comprises:

staying in the environmental operating mode if continuously receiving the environmental signal corresponding to an information indicated in the notification message via the short-ranged wireless communication technology.

18. The operating mode switching method of claim 1, wherein the step of staying in the environmental operating mode if continuously receiving the environmental signal corresponding to the notification message via the short-ranged wireless communication technology comprises:

staying in the environmental operating mode if continuously receiving the environmental signal indicated in the notification message via the short-ranged wireless communication technology.

19. An operating mode switching method for an electronic device, comprising:

receiving a notification message via a proximity-based wireless communication technology in an initial operating mode;

switching from the initial operating mode to an environmental operating mode corresponding to the notification message after receiving the notification message via the proximity-based wireless communication technology; and performing following steps while in the environmental operating mode:

staying in the environmental operating mode if continuously receiving an environmental signal corresponding to an information indicated in the notification message via a short-ranged wireless communication technology, and switching from the environmental operating mode back to the initial operating mode when not effectively receiving the environmental signal corresponding to the notification message via the short-ranged wireless communication technology;

wherein the initial operating mode and the environmental operating mode respectively provide different user sensible notifications to notify a user in response to a received incoming event.

20. The operating mode switching method of claim 19, wherein the step of staying in the environmental operating mode if continuously receiving the environmental signal corresponding to the information indicated in the notification message via the short-ranged wireless communication technology comprises:

staying in the environmental operating mode if continuously receiving the environmental signal indicated in the notification message via the short-ranged wireless communication technology.

* * * * *